June 2, 1964     A. D. COGGESHALL     3,135,888
STRUCTURE FOR RETAINING GENERATOR END WINDINGS
Filed Feb. 1, 1961
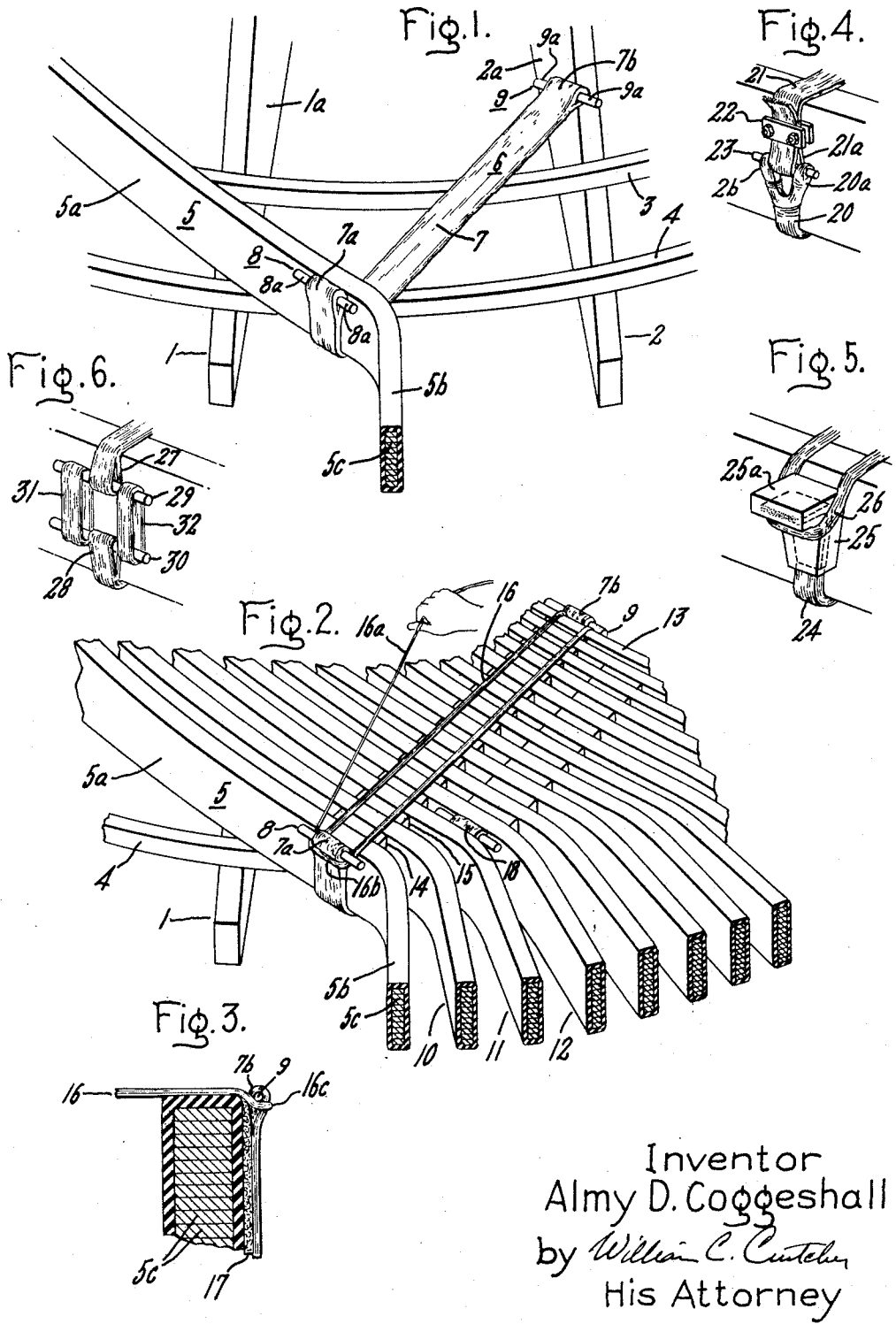
Inventor
Almy D. Coggeshall
by William C. Crutcher
His Attorney United States Patent Office 3,135,888
Patented June 2, 1964

3,135,888
STRUCTURE FOR RETAINING GENERATOR END WINDINGS
Almy D. Coggeshall, Schenectady, N.Y., assignor to General Electric Company, a corporation of New York
Filed Feb. 1, 1961, Ser. No. 86,494
8 Claims. (Cl. 310—271)

This invention relates to an improved retaining means for electrical conductors and to a method for applying the retaining means. More particularly, it relates to a high strength insulating tension strap assembly for holding a group of armature or stator bars, which allows a single armature bar to be replaced more easily than with prior art end winding retaining arrangements.

High voltage electrical devices, such as transformers or large turbine-generators, often employ electrical conducting members of a significant size. Under certain conditions of loading or operation of the apparatus, these conductors are subjected to magnetic or mechanical disturbances tending to dislodge them. To this end, elaborate structures are often employed to hold them securely in position.

One example of such a structure is the end winding support system for a large generator stator where the connecting end turns are secured to a structural member, and tension members may be employed as components of the structure to hold the end turns in place and to adjust for irregularities. An example of such an end turn support system is disclosed in U.S. Patent 3,089,048, J. J. Bahn et al., issued May 7, 1963.

In end winding support systems the armature bars, which are disposed in slots in a laminated core, have projecting end turn portions of complex curvature. These end turn portions must not only be secured to the end winding support structure but must be secured to one another. The end turns are generally spaced from one another by spacer blocks, which can be of the rigid or of the "conformable" type. A suitable "conforming" spacer block for this application is disclosed in U.S. Patent 2,980,757, A. D. Coggeshall et al., issued April 18, 1961. These "conformable" blocks may adjust to irregularities while uncured, but when cured can take substantial loads in compression. Previously each bar was separately lashed to its neighboring bar or bars by tying cord which was waxed or impregnated with a resin such as varnish. The cord had to be passed in and out around the bars in a single strand. Such a procedure was time-consuming and costly, and in the event a defective armature bar had to be replaced, the lashing connecting adjacent bars and the lashing holding a group of bars to the supporting structure had to be severed and later replaced. More important, if each bar is separately lashed to the neighboring bar it can move relative to that bar by the amount of slack in the lashing loop. The total accumulated movement by a group of bars so lashed can be excessive. It was discovered that a single tension member encircling a number of bars at one time is more desirable, since the total movement of the group of bars is equal to the slack in the one lashing instead of the accumulated slack of several lashings.

It is important that, if a single encircling tension member is used, there must be some way for removing and replacing single armature bars. It is also important that a tension member used in electrical apparatus in the vicinity of the conductors be composed of insulating materials to eliminate induction heating effects. The tension member disclosed in this application satisfies these requirements.

It is well known that a single glass filament in pure tension has a very high tensile strength. The strength may be increased in proportion to the number of individual filaments by grouping the filaments into strands, provided that each filament receives its proportionate share of the load. Uniformity of load sharing between fibers can be greatly enhanced by bonding the fibers together with a curable resin with which the fibers have been previously impregnated. The resinous matrix enables the individual fibers to share load, in spite of the fact that each fiber may not be under the same tension as its neighbor. Numerous polymerizable resins are known in the reinforced plastics art and curing may be effected by heat, chemical catalyst, or by other means, to cause the resin to solidify. In addition to the use of a curable resin binding it is also important, when designing a tension member fabricated of glass fiber, to insure that all fibers are arranged in an optimum load-sharing relation to each other.

Another problem encountered when designing a tension member of glass fiber is that of devising suitable members to hold the opposite ends of the strands. It is found to be much easier to obtain equal loading of the strands by terminating the tension member in a loop portion so that the fibers can adjust.

Accordingly, one object of the present invention is to provide an improved glass fiber, resin-bonded insulating tension strap assembly.

Another object is to provide an improved method for attaching multi-fiber loops to an end fitting or anchor member.

Still another object is to provide an improved method for securing a group of armature or stator bar end winding portions together.

A further object is to provide an improved stranded tension strap assembly, which is flexible for ease of assembly but which can be cured to a rigid state after assembly.

Still another object is an improved means for securing armature bar end windings, which permits easy replacement of one or more armature bars.

Another object of the invention is to provide a single encircling tension strap assembly for applying a restraining force to a group of conductors separated by compression spacer blocks.

The subject matter which is regarded as the invention is particularly pointed out and distinctly claimed in the concluding portion of this specification. The invention, however, both as to organization and method of practice, together with further objects and advantages thereof, may best be understood by reference to the following description taken in connection with the accompanying drawing in which:

FIG. 1 is a perspective view showing placement of a single end winding portion of an armature bar on the lower part of the tension strap assembly;

FIG. 2 is a perspective view of the group spaced end winding portions in place as the upper part of the tension strap assembly is applied;

FIG. 3 is an enlarged cross-sectional view of the assembled connection between upper and lower parts of the tension strap assembly; and FIGS. 4–6 are perspective views of modified connections.

Generally stated, the invention is practiced by providing a tension strap assembly in at least two load bearing portions which, when connected end-to-end by suitable connections, completely encircle a group of members, such as armature bars separated by spacer blocks. The load bearing portions of the tension strap are preferably of glass fiber impregnated with a curable resin.

Referring now to FIG. 1 of the drawing, this perspective view shows a portion of the supporting structure for holding the insulated end turn portions of high voltage armature bars. The structure in part includes members 1, 2 which extend both axially and radially from the dynamoelectric machine casing (not shown) and are secured thereto at their inner ends 1a, 2a. Members 1, 2 may be disposed generally as elements of a frusto-conical surface having its smaller diameter toward the dynamoelectric machine casing. They may also be mounted to move axially with respect to the casing to provide for differential thermal expansion of the armature bars with respect to the casing as disclosed in the aforementioned Patent 3,089,048. The support structure may or may not also include coaxial ring members 3, 4 to provide additional support for the armature bar end turn portions.

The end turn portion of an armature bar is shown generally at 5 and includes an insulated portion 5a lying generally skewed with respect to the stator axis crossing member 1 at an angle, and a short coil apex portion 5b which has the insulation removed at its end to expose the conductor strands 5c. Bar 5 shown is generally called a "bottom bar," since it emerges from the bottom of an armature core slot (not shown). In a generator having two bars in each armature slot, the conductors 5c of apex portion 5b will be electrically connected to a similar apex portion lying radially inward which will be a part of a "top bar" curving to enter a slot circumferentially spaced from that whence bar 5 emerged.

The foregoing explanation relates to a specific type of armature end winding construction, however it will be apparent as the description proceeds that the method and means for retaining generator end windings as set forth herein is applicable to many other types of constructions, where electrical conductors are to be retained to one another or to a supporting structure.

The lower portion of the tension strap assembly, which is the subject of this invention, is most clearly seen in FIG. 1. It is understood that "lower" and "upper" as used herein mean radially outer and radially inner, respectively, and are merely used for convenience as applying to the view of the support structure shown in FIGS. 1 and 2. There a tension strap assembly lower portion shown generally as 6 comprises a single multi-strand loop 7, with dowel members 8, 9 inserted in the opposite bights 7a, 7b of the loop. Each of the dowels 8, 9 is long enough to leave projecting end portions 8a, 9a, respectively.

Dowels 8, 9 are constructed of rigid insulating material and preferably are cylindrical rods of glass fiber impregnated with a suitable resin binder. Numerous substitutions of equivalents for the material of dowels 8, 9, such as ceramics or high strength plastics, will occur to those skilled in the art.

The loop 7 is a continuous loop made up of many strands of a suitable high strength insulating material such as glass fiber. Each strand comprises many individual glass filaments which, when impregnated with a resin binder, provides a very high tensile strength.

A very convenient and low cost form of glass fiber is known commercially as "60 end roving" which consists of an essentially dry bundle of 60 groups of glass fiber, each group comprising 204 tiny filaments. The loop 7 shown is prepared previous to the assembly operation by wrapping a continuous strand around a mandrel. For convenience, several strands of the "60 end roving" can be gathered and handled together. The total number of turns in the loop, of course, can be selected by one skilled in the art to provide the required strength.

Obviously, the number of strands handled in making the loop 7 is unimportant, as long as the desired total number of strands is achieved in a continuous loop so that the load will be shared between strands. Also, the number of strands used for a particular application will vary with the size of the strand, the "60 end roving" being given merely as an example. It is important to note that little or no twisting is given to the strands in loop 7, in order that the strands will be subjected to substantially pure tension.

As loop 7 is formed, the strands are coated or impregnated with a curable resin, such as by drawing through a tank of the liquid resin as the loop is wound. A heat curable resin may profitably be employed, with perhaps the addition of a catalyst for accelerating the cure. A suitable resin for impregnating the glass fibres of loop 7 is No. 3405 "Permafil," manufactured by the General Electric Company, an excellent material for this purpose, since in the uncured state it is a somewhat rubbery solid which imparts a soft, limp, tack-free consistency to the glass fiber strands impregnated with it.

Many other such resins are known to the art, which when cured will impart the binding between fibres which will give them a high strength. Other examples are epoxy, or styrene-bearing unsaturated polyester resins. These can be designed to cure either at elevated temperatures or at room temperature. Curing systems which permit room temperature solidification are well known, a typical example being the incorporation of 0.2% of a cobalt salt, for example cobalt naphthanate in the resin followed by an addition of a peroxide such as methylethylketone peroxide.

Reference to FIG. 2 illustrates the end winding retaining assembly with the remaining additional armature bar end portions 10, 11, . . . 13 in place and lying on top of or radially inward from the tension strap lower portion 6. The armature bar end portions 5, 10, 11, 13 are separated by spacer blocks 14, 15, etc., which are preferably of the "conformable" type. A suitable spacer block for this application is disclosed in the aforementioned Patent 2,980,757. It should be noted that the spacer blocks 14, 15 are all aligned with one another along a line substantially normal to the armature bars and lie on top of the lower portion 6 of the tension strap assembly. Since blocks 14, 15 are not rigid when first applied, they "conform" to armature bar shape and armature bar spacing. By this means, the load is distributed on the full surface of each block after it is cured to a rigid mass.

The loop 7 of tension strap assembly 6 is of such a length that when the armature bar end portions are all in place, the ends of loop 7 may be folded up as shown in the drawing to partially enclose the group of armature bars, with dowels 8, 9 lying just below the radially innermost parts of the armature bars.

FIG. 2 illustrates an upper loop 16 being applied which, together with the lower loop 7 and the dowels 8, 9, forms the complete tension strap assembly. The number of strands in completed top loop 16 is preferably the same number as in the bottom loop 7. However, instead of being prewound, the top loop 16 is wound at the assembly site by passing a strand or group of strands 16a back and forth around the projecting dowel ends 8a, 9a while the strands 16a are under tension. The sides of loop 16 may also cross in a figure 8 pattern to give additional strength, although this is somewhat bulkier than the uncrossed loop 16 illustrated. The opposite end bights 16b, 16c of loop 16 pass around the bights 7a, 7b, respectively, and under the dowel portions 8a, 9a, although obviously the order of placing the bights could be reversed.

The enlarged cross-sectional view of FIG. 3 illustrates the manner in which the end bights 7b, 16c of loops 7, 16 are interlooped and held against disengagement by the dowel 9. It will also be observed that dowel 9 lies below the top surface of bar 13 so as not to interfere with subsequent rows of armature bars. A suitable plastic filler 17 may be applied between the bar and the loops to decrease the stress due to the sharp corner at the armature bar edge.

FIG. 4 illustrates a modified connection of the "yoke and clevis" type. There the end portion 20 of a lower continuous loop (not shown) is divided into two bifurcations 20a, 20b to form a clevis. The end portion 21 of an upper group of impregnated glass fibers (not shown) is doubled back to form a bight portion 21a and secured with a clamp 22. A dowel member 23 passing through bight portion 21a and bifurcations 20a, 20b serves to connect the upper and lower halves 20, 21 of the tension strap assembly.

FIG. 5 illustrates another modification. Here an end portion 24 of a lower group of impregnated glass fibers (not shown) terminates in a molded fitting 25. The fitting 25 has a flange 25a to serve somewhat as a hook. The end bight portion 26 of a continuous loop (not shown) passes around flange 25a. The upper loop may be applied as loop 16 illustrated in FIG. 2.

FIG. 6 illustrates yet another modification of the end connection. There both the upper and lower parts (not shown) are continuous loops terminating in bights 27, 28. Dowel members 29, 30, inserted in the bights are drawn together by smaller lops 31, 32 of glass fiber as shown.

It should be noted that in all the modifications the tension strap assembly is composed of at least two parts, one of which is applied after the bars are in place so that the assembly completely encircles a rank of bars.

The method of assembling a group of armature bars with my preferred tension strap assembly shown in FIGS. 1-3 may be described as follows. First, the lower loop 7 is laid diagonally on hoops 3, 4 at a right angle to the direction the end portions of the armature bars will take. Armature bars 5, 10, 11, . . . 13 are successively inserted in the armature slots with spacer blocks 14, 15, . . . etc., being placed on top of loop 7 between armature bars. Blocks 14, 15 may be temporarily retained to each bar with a piece of tape.

As the insertion of armature bars proceeds, additional assemblies of tension straps may be commenced, and a portion of such a new assembly is indicated in FIG. 2 by reference numeral 18. As soon as the last bar 13 is in place, together with all of the spacer blocks for the particular group being secured, the tension strap assembly may be completed. Dowels 8, 9 are inserted in the bights 7a, 7b of lower loop 7 and the bights folded upward and some tension exerted so as to distribute the load equally among strands. This may be done by mechanical tension-applying means, but is best done by hand.

Upper loop 16 is formed by passing an impregnated strand or group of strands 16a back and forth between dowels 8, 9. The hand shown holding strands 16a in FIG. 2 is symbolic of a means to wrap loop 16 under constant tension. This may be done by hand, by using a stick to apply leverage, or by a mechanical tensioning means. The ends of strands 16a are first secured to one of the dowels 8, 9 with a noose or slip knot.

The strands 16a are then passed under end portion 8a, over the bight 7a of lower loop 7, under the opposite end 8a of the dowel, and this process is repeated at dowel 9. As soon as a few turns have been made, the friction will prevent the free starting end of the strands from coming disengaged. The strands are passed back and forth under constant tension until the loop is complete, and the other free end of the strands may be looped three or four times around the dowel or may be sealed locally to adjacent strands with a hot iron which activates the curing agent in the resin.

The resin impregnating system may be designed so that each tension strap assembly cures at room temperature as it is applied, but preferably a higher temperature curing resin is selected, and all of the tension strap assemblies are applied. Then the complete stator is placed in an oven and the tension strap assemblies are cured simultaneously at an elevated temperature.

To remove a defective bar, it is particularly important to note that the lower portion 6 of the tension strap assembly need not be removed. This is a considerable improvement over previous constructions. To replace a bar, the upper loop is severed with means such as a bolt cutter, and the severed portions of the loop are spread apart whereupon they will generally break in bending near the dowel, and can be disengaged. It will be seen at this point that the armature bar end portions are unobstructed on top and can be lifted radially inward while the other bars remain in place. Once a defective bar has been replaced, a new top loop 16 is applied as previously described.

An examination of the modified connections illustrated in FIGS. 4-6 should make it apparent how they are applied. In FIG. 4, the lower bifurcated loop 20 and dowel 23 are placed in position. The end of top piece 21 is drawn tight around the dowel and clamp 22 tightened. In FIG. 5 the top loop 26 is wrapped in a continuous loop similar to loop 16 in FIG. 2. In FIG. 6, the top and bottom bights 27, 28 are placed, dowels 29, 30 inserted, and loops such as 31, 32 are wound as in FIG. 2 to draw the dowels together. Clearly, a single loop or a single figure 8 loop could be substituted for loops 31, 32.

The tension strap assembly provides great resistance to transverse spreading of the armature bar end portions. Similarly, the spacer blocks 14, 15, etc. prevent transverse displacement toward one another. The strength of such an impregnated fiber glass tension strap assembly is considerable. For the assembly described comprising loops of "60 end roving" having about 70 turns of such roving, each loop has a tensile strength in excess of 20,000 pounds. The ease of application compared with prior art methods of separately lashing each armature bar represents a significant improvement in retaining end windings. One such tension strap assembly takes the place of six so-called "chain ties" which were used to lash two adjacent bars together in previous constructions. The completely encircling tension strap assembly provides greatly improved retaining over individually lashed bars, especially when used together with conformable spacer blocks. The saving in labor in applying the tension strap assembly is considerable and the assembly allows the easy replacement of a defective bar.

While there has been described what is at present considered to be the preferred embodiment of my invention, it will be understood that various modifications may be made therein, and it is intended to cover in the appended claims all such modifications as fall within the scope of the invention.

What I claim as new and desire to secure by Letters Patent of the United States is:

1. In combination, a plurality of substantially parallel conductor bars, a plurality of aligned spacer blocks transversely separating said conductor bars, and a tension strap assembly completely encircling said conductor bars and spacer blocks and being under tension, said tension strap assembly comprising a multiplicity of high tensile strength filaments bonded with a curable resin, whereby the tension strap assembly when cured acts as a substantially unitary loop to restrain transverse forces tending to separate said conductor bars, said tension strap assembly also comprising at least two separable tension members made up of said filaments and connected end-to-end.

2. In combination, a plurality of substantially parallel conductor bars, a plurality of aligned spacer blocks transversely separating said conductor bars, and a tension strap assembly completely encircling said conductor bars and spacer blocks, said tension strap assembly comprising at least two separable tension members, at least one of said tension members comprising a multiplicity of high tensile strength filaments bonded with a curable resin, and means to connect said tension members end to end after the conductor bars are in place, whereby the tension strap assembly when cured acts as a substantially unitary loop to restrain transverse forces tending to separate said conductor bars.

3. The combination according to claim 2 wherein said spacer blocks are characterized by being "conformed" to the conductor bar shape and transverse spacing, whereby the load due to said transverse forces is uniformly distributed.

4. In combination, a plurality of substantially parallel conductor bars, a plurality of aligned spacer blocks transversely separating said conductors, and a tension strap assembly completely encircling said conductor bars and spacer blocks comprising at least two tension members each having a body portion of a multiplicity of high tensile strength filaments bonded with a curable resin and connected end-to-end about said bars and spacer blocks, at least one of said tension members comprising a single loop of continuous turns of a multi-filament strand of said high tensile strength fibers coated with a curable resin binder and secured between the spaced ends of other tension members, whereby said loop may be applied to tension the tension strap assembly after the conductor bars are in place and may be severed and replaced with a similar loop when it is desired to remove one or more conductor bars.

5. In combination, a plurality of generally parallel conductors, a plurality of aligned spacer blocks transversely separating said conductors, and a tension strap assembly comprising a plurality of loops, each including continuous turns of a multi-filament strand of high tensile strength fibers coated with a curable resin binder, said loops lying end-to-end so as to encircle the conductor group, each of said loops also including opposite end bight portions engaged with bight portions of adjacent loops on either end, and retaining means inserted in said bight portions to prevent disengagement of the loops from one another.

6. A tension strap assembly for transversely retaining a group of generally parallel members comprising first and second loops of continuous turns of a multi-filament strand of high tensile strength filaments coated with a curable resin binder, said first and second loops lying transversely to said members on opposite sides thereof and each having opposite bight portions folded toward one another, whereby the first and second loops enclose the members, said first and second loop bight portions being engaged with one another at either end thereof, and dowel means inserted in the bight portions of the first and second loop engaged bight portions.

7. A tension strap assembly for transversely retaining a plurality of parallel members comprising first and second loops of continuous turns of a multi-filament strand of high tensile strength filaments coated with a curable resin binder, said first loop lying normal to the members and being of a greater length than the transverse dimension across the group of members and having opposite bight portions folded to partially enclose the members, said second loop being aligned with said first loop and on the opposite side of the members therefrom and having opposite bight portions each passing around respective bight portions of the first loop, and dowel means passing through each of the first loop bight portions and having projecting end portions to prevent disengagement of the first and second loop bight portions.

8. The tension strap assembly according to claim 5 wherein the high tensile strength filaments are comprised of glass fiber.

References Cited in the file of this patent

UNITED STATES PATENTS

| | | |
|---|---|---|
| 1,310,063 | Cummings | July 15, 1919 |
| 2,482,527 | Weil | Sept. 20, 1949 |
| 2,483,024 | Roters | Sept. 27, 1949 |
| 2,519,219 | Baudry et al. | Aug. 15, 1950 |
| 2,763,916 | Korski | Sept. 25, 1956 |
| 2,774,899 | Zeissler | Dec. 18, 1956 |
| 2,994,735 | Marshall et al. | Aug. 1, 1961 |

FOREIGN PATENTS

| | | |
|---|---|---|
| 450,572 | Canada | Aug. 17, 1948 |